(12) United States Patent
Malinowski

(10) Patent No.: US 9,615,140 B1
(45) Date of Patent: Apr. 4, 2017

(54) METHOD AND DEVICE FOR DELIVERY OF SUBTITLE SYNCHRONIZED WITH A MEDIA STREAM

(71) Applicant: Edward Malinowski, Racine, WI (US)

(72) Inventor: Edward Malinowski, Racine, WI (US)

( * ) Notice: Subject to any disclaimer, the term of this patent is extended or adjusted under 35 U.S.C. 154(b) by 0 days.

(21) Appl. No.: 15/010,271

(22) Filed: Jan. 29, 2016

Related U.S. Application Data

(63) Continuation-in-part of application No. 14/494,634, filed on Sep. 24, 2014, which is a continuation-in-part of application No. 12/800,987, filed on May 27, 2010, now abandoned.

(51) Int. Cl.
| | |
|---|---|
| *G06F 3/16* | (2006.01) |
| *H04N 21/488* | (2011.01) |
| *H04N 21/414* | (2011.01) |
| *H04N 21/426* | (2011.01) |
| *H04N 21/437* | (2011.01) |
| *H04N 21/43* | (2011.01) |
| *H04N 21/61* | (2011.01) |
| *G06K 9/00* | (2006.01) |
| *G07C 9/00* | (2006.01) |

(52) U.S. Cl.
CPC ... *H04N 21/4884* (2013.01); *H04N 21/41407* (2013.01); *H04N 21/42684* (2013.01); *H04N 21/4302* (2013.01); *H04N 21/437* (2013.01); *H04N 21/6125* (2013.01); *G06K 9/0002* (2013.01); *G07C 9/00158* (2013.01)

(58) Field of Classification Search
CPC .. G06K 9/0002; G07C 9/00158; H04N 7/181; H04N 5/33
USPC ........ 382/100, 116, 112, 103, 124; 348/468, 348/461–465, 222.1; 715/716, 719, 727, 715/728, 201
See application file for complete search history.

(56) References Cited

U.S. PATENT DOCUMENTS

| | | |
|---|---|---|
| 5,946,046 A | 8/1999 | You et al. |
| 6,076,059 A | 6/2000 | Glickman et al. |
| 6,239,843 B1 | 5/2001 | Gaudreau |
| 6,816,201 B1 | 11/2004 | Fang et al. |
| 6,941,275 B1 | 9/2005 | Swierczek |
| 7,075,587 B2 | 7/2006 | Lee |

(Continued)

FOREIGN PATENT DOCUMENTS

WO 2005006758 A1 1/2005

OTHER PUBLICATIONS

Sagotra, Rajan and Aggarwal, Reena; "Visible Light Communication", International Journal of Computer Trends and Technology, Apr. 2013,pp. 906-910, vol. 4, Issue 4, Seventh Sense Research Group, Chennai, India; published on line at http://www.ijcttjournal.org.

*Primary Examiner* — Brian Yenke
*Assistant Examiner* — Omer Khalid
(74) *Attorney, Agent, or Firm* — Werschulz Patent Law, LLC

(57) ABSTRACT

A method and device for synchronizing text with a media production, such as a video, and displaying the text on a portable display device, thereby providing subtitles for the video, is hereby provided. The method is carried out by receiving a sample of UV light from the video display, creating a digital fingerprint that includes time data, associating a text file stored in a database with the video, synchronizing text with the display, and displaying the text to a user with the portable display device.

3 Claims, 13 Drawing Sheets

(56) References Cited

U.S. PATENT DOCUMENTS

| | | |
|---|---|---|
| 7,221,405 B2 | 5/2007 | Basson et al. |
| 7,337,462 B2 | 2/2008 | Dudkiewicz et al. |
| 2005/0227614 A1 | 10/2005 | Hosking et al. |
| 2008/0062315 A1 | 3/2008 | Oostveen et al. |
| 2008/0263620 A1 | 10/2008 | Berkvens et al. |
| 2010/0226526 A1 | 9/2010 | Modro et al. |
| 2012/0262487 A1 | 10/2012 | Huebner |
| 2013/0336525 A1 | 12/2013 | Kurtz et al. |
| 2014/0056172 A1* | 2/2014 | Lee ................ H04W 76/02 370/254 |

* cited by examiner

METHOD AND DEVICE FOR DELIVERY OF SUBTITLE SYNCHRONIZED WITH A MEDIA STREAM

CROSS-REFERENCE TO RELATED APPLICATIONS

This application is a nonprovisional continuation-in-part utility application of the nonprovisional continuation-in-part utility application Ser. No. 14/494,634, filed on Sep. 24, 2014, of the nonprovisional utility patent application, Ser. No. 12/800,987, filed in the United States Patent Office on May 27, 2010 and claims the priority thereof and is expressly incorporated herein by reference in its entirety.

TECHNICAL FIELD

This disclosure relates to a method and device for the delivery of text as subtitles for a media stream. More particularly, the disclosure relates to a method and portable device that identifies, synchronizes, and displays subtitles of a media stream such as a film, music, and Internet streaming media.

BACKGROUND

Many television broadcasts incorporate closed caption "CC" or subtitle information. A primary purpose for providing subtitles with the broadcast media is to enable the deaf and hard-of-hearing viewers to understand the audio portion of the broadcast. Other purposes may include, for example, selective subtitling for foreign language media. In a conventional TV set, closed caption information is decoded from the broadcast video signal and made ready for display on the bottom of the screen by use of dedicated video processors built into the television hardware.

Films, especially foreign films, may have subtitles displayed on the screen at theaters. However, most films shown at theaters do not display subtitles on the video screen as it may interfere with the video content of the film and may not be needed by most viewers.

Many types of media delivered to listeners and viewers do not have subtitles. For example, the radio broadcasts audio only and has no means for displaying subtitles. Also, many other forms of media, such as media delivered over the Internet, may not provide a means to receive and view subtitles.

Many times when subtitles for media are available, it may be difficult to receive and display the subtitles by the listener or viewer. For example, specialized equipment may be required, especially when subtitles are not a part of the broadcast. Streaming video or video downloaded from the Internet may not include subtitles as part of the stream or download. Additionally, when subtitles are not a part of broadcast, the subtitles may be displayed out of synchronization with the video portion of the broadcast.

While these devices may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a less complex means for listeners or viewers of media to display subtitles.

Another aspect of an example embodiment in the present disclosure is to provide a device and method that allows the individual users to have subtitles displayed for a variety of media.

A further aspect of an example embodiment in the present disclosure is to provide a portable device and method that allows the user to view subtitles simply by relaying a sample of the audio portion of the media, with the portable device, to a system configured to locate, retrieve, and send a text file to the portable device for display.

A further aspect of an example embodiment in the present disclosure is to provide a portable device and method that allows the user to view subtitles simply by relaying an output sample of the media signal, the output sample including infrasonic, ultrasonic, infrared, ultraviolet or tactile signals, with the portable device, to a system configured to locate, retrieve, and send a text file to the portable device for display.

Still a further aspect of an example embodiment in the present disclosure is to provide a portable device and method that allows to view subtitles by capturing ultraviolet light (UV) emitted from a media production such as a video display, the UV light providing an identifying sample digital fingerprint of the video display that includes time data derived by comparing the sample digital fingerprint to a full digital fingerprint produced by said UV light, transmitting the sample digital fingerprint to a further device hosting a database containing a plurality of text files, associating the sample fingerprint to the text file and synchronizing the text for displaying on the portable device.

A still further aspect of an example embodiment in the present disclosure is to provide a device and method configured to synchronize text, in a stream of text sent by a remote system to the device, for displaying on the device thus providing subtitles in synchronization with the media.

Yet a further aspect of an example embodiment in the present disclosure is to provide a method for displaying subtitles on a portable text display device comprising the steps of: a) receiving a sample of an audio output from a media production, with the portable text display device; b) sending the sample of the audio output, with the portable text display device, to a remote system comprising a database of text files and associated electronic digital fingerprints of audio associated with the text files; c) comparing an electronic digital fingerprint of the sample of the audio output to the electronic digital fingerprints of audio associated with the text files in the database, with the remote system; d) associating a text file with the media production, with the remote system; e) sending the associated text file to the portable text display device, with the remote system; f) receiving the associated text file with the portable text display device; g) synchronizing text in the text file with the audio output from the media production; and h) displaying, with the text display device, text synchronized with the audio output from the media production.

Yet a further aspect of an example embodiment in the present disclosure is to provide a method for displaying subtitles on a portable text display device comprising the steps of: a) receiving a sample of an output from a media production with the portable text display device; b) sending the sample of the output, with the portable text display device, wherein the output sample includes infrasound, ultrasound, infrared, ultraviolet or tactile output, to a remote system comprising a database of text files and associated electronic digital fingerprints of infrasonic, ultrasonic, infrared, ultraviolet or tactile signals associated with the text files; c) comparing an electronic digital fingerprint of the sample of the signal output to the electronic digital fingerprints of associated with the text files in the database, with the remote system; d) associating a text file with the media production, with the remote system; e) sending the associated text file to the portable text display device, with the remote system; f) receiving the associated text file with the portable text display device; g) synchronizing text in the text file with the output from the media production; and h) displaying, with the text display device, text synchronized with the output from the media production.

Yet another aspect of an example embodiment in the present disclosure is to provide a method for displaying subtitles wherein a remote system sends text synchronized with the audio output from the media production and a portable text display device displays the subtitles upon receiving the synchronized text. The portable display device may send a time-coded sample of the audio output of the media production for the remote system to locate and synchronize the text for sending to the portable text display device.

Yet another aspect of an example embodiment in the present disclosure is to provide a method for displaying subtitles wherein a remote system sends text synchronized with the output sample from the media production and a portable text display device displays the subtitles upon receiving the synchronized text. The portable display device may send a time-coded sample of the output of the media production for the remote system to locate and synchronize the text for sending to the portable text display device.

Still a further aspect of an example embodiment in the present disclosure is to provide a method for displaying subtitles of a media production wherein a remote system sends a text file with audio fingerprints associated with the text in the text file, to a portable text display device. The portable text display device synchronizes the text for displaying subtitles therewith by associating the audio fingerprints with audio received by the portable text display device from the media production.

Still a further aspect of an example embodiment in the present disclosure is to provide a method for displaying subtitles of a media production wherein a remote system sends a text file with electronic digital fingerprints associated with the text in the text file, to a portable text display device. The portable text display device synchronizes the text for displaying subtitles therewith by associating the electronic digital fingerprints with the output sample received by the portable text display device from the media production.

Yet a further aspect of an example embodiment in the present disclosure is to provide a method wherein a remote system sends a time coded text file to the portable display device. The portable text display device is configured to track elapsed time of the media production and synchronize the display of text therewith by comparing the elapsed time with a time code associated with the received text file.

Yet a further aspect of an example embodiment in the present disclosure is to provide a method wherein a remote system sends a time coded text file to the portable display device. The portable text display device is configured to track elapsed time of the media production and synchronize the display of text therewith by comparing the elapsed time with a time code associated with the received text file.

The present disclosure describes a method and device for displaying subtitles on a portable text display device. A sample of the audio portion or UV light emitted by the display of a media production may be received by the portable text display device and sent to a remote system. The sample may be sent wirelessly via the Internet in the form of a sound wave or light waves. In conjunction with the sample, the portable text display device may also send a time code or time stamp of the sample.

An electronic digital sample of a media production may be received by the portable text display device and sent to a remote system. The output sample may be sent wirelessly via the Internet in conjunction with the sample, the portable text display device may also send a time code or time stamp of the output sample. The output sample includes electronic digital fingerprints of infrasonic, ultrasonic, infrared, ultraviolet or tactile signals.

The remote system receiving the fingerprint sample may have a database of text files with electronic digital fingerprints associated therewith. The remote system may be configured to identify or associate a text file with the media production by comparing the digital fingerprint of the audio or UV light sample with the electronic digital fingerprints of audio associated with the text files in the database. Upon associating a text file with the media production, the remote system may send electronic digitally fingerprinted text, time coded text, and/or text synchronized with the media production.

In the aspect of the example embodiment where the remote host sends synchronized text to the portable display device, the portable display device may display the text upon receipt from the remote system. The remote system may synchronize the text for sending to the portable display device by locating the sample within the text file associated with the media production and calculating the time to send each piece of text from a time code associated with the text file and a time which the sample was sent to the remote or a time stamp sent by the portable text display device with the sample.

In an aspect of the example embodiment where the portable text display device is configured to synchronize the text with the media production, the remote system may send a text file with an associated electronic digital fingerprint. The electronic digital fingerprint may be a time value, a sound wave, or both. The portable display device is configured to synchronize the text with the media production by comparing a fingerprint of the audio being received with the electronic digital fingerprint associated with the text file, by displaying text based on elapsed time, or a combination thereof. For example, a fingerprint of the media production may be periodically compared with the fingerprint of audio associated with the text file and elapsed time may be used to synchronize the text with the media production between comparisons.

In an aspect of the example embodiment where the portable text display device is configured to synchronize the text with the media production, the remote system may send a text file with an associated electronic digital fingerprint.

The portable display device is configured to synchronize the text with the media production by comparing a fingerprint of the output being received with the electronic digital fingerprint associated with the text file, by displaying text based on elapsed time, or a combination thereof. For example, a fingerprint of the media production may be periodically compared with the fingerprint associated with the text file and elapsed time may be used to synchronize the text with the media production between comparisons.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE
PREFERRED EMBODIMENTS

Figure 1:
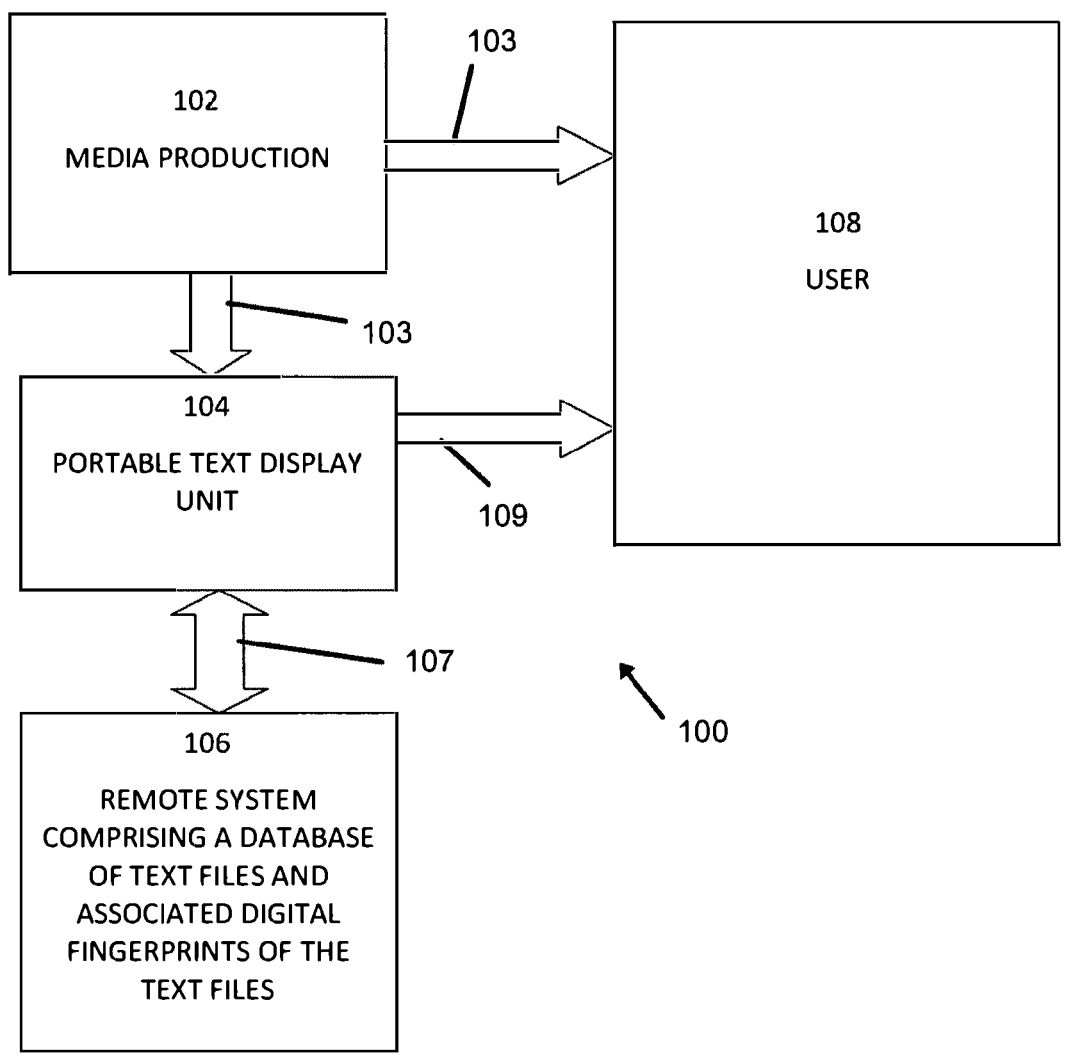
FIG. 1 is a block diagram, illustrating the functional interconnection of elements of the method and device according to the present disclosure.

FIG. 1 illustrates elements 100 of a method and device configured to display subtitles of a media production or media stream 102 to a user 108. Block 102 illustrates the media production that can include an audio or audiovisual production such as a film, show, music, string content over the Internet or other production. Arrow 103 designates the audio portion of media production 102. The audio portion 103 of media production 102 is delivered to user 108 and a portable text display device 104 simultaneously. Audio portion 103 may be comprised of spoken words, in any language, and other sounds.

In one example embodiment, the portion delivered to the portable text display device can include stings of ultrasonic, infrasonic, ultraviolet, infrared and tactile waves. These wave strings can be native to the media production content in one example embodiment, or can be input artificially for later detection by the portable text display device.

All transmitted signals from the media production 102 have a carrier wave that can carry additional signal waves such as inaudible sound waves in the ultrasonic (greater than 20,000 Hz), infrasonic (less than 20 Hz) ranges, invisible light waves in the infrared (700 nm to 1 mm wavelength) and ultraviolet (400 nm to 10 nm wavelength) ranges and tactile waves that are not seen or heard but felt in the body, ranging in frequency from 1 Hz to 3 kHz. These waves can be added to the carrier signal along with a portion of a media production 102 or are native to the media production signal. The signal can then sample a portion of these inaudible and invisible waves to create a digital fingerprint for the associated wave carried by the same carrier wave as explained hereinbelow.

For the purposes of this disclosure, digital fingerprinting is defined as a technique in which software identifies, extracts, digitizes and then compresses characteristic components of a media production, such as a video, enabling that video to be uniquely identified by its resultant digital fingerprint. In one example embodiment, the characteristic that is extracted and digitized in the fingerprint is the ultraviolet (UV) light that is transmitted from the display of the video. The UV light, invisible to the ordinary user, may be native to the video being displayed or added to the video as a means of identification.

In other example embodiments, the characteristic that is extracted and digitized may be visible light and infrared light transmitted by the display of the video or may be ultrasonic, infrasonic and tactile waves transmitted by the audio portion of the video production.

Portable text display device 104 may be an electronic digital device such as a personal digital assistant (PDA), cell phone with Internet and text display capabilities, such as a "smartphone", tablet computer, or other portable electronic digital device. In one example embodiment, the text display device 104 is provided with application software configured to provide the functionality of the portable text device 104 disclosed herein. In one example embodiment, the text display device 104 has a microphone for receiving audio portion 103 of media presentation 102, a display screen for displaying text to user 108 as shown with arrow 109, and a wireless internet connection, e.g. a wireless transmitter and receiver, for sending and receiving digital information from a remote system as shown with arrow 107.

In one aspect of the present disclosure, portable text display device 104 is configured to receive a sample of audio portion 103 via a microphone and digitize the audio sample into a digital fingerprint. In one example embodiment, the audio sample is digitized into a waveform. In a further example embodiment, the portable text display device 104 is configured to time code or time stamp the digital fingerprint of the audio sample. The audio sample may be comprised of a few seconds of audio portion 103, or a minute or more, in one-second increments. Portable text display device 104 is also configured to send the audio sample and any time code to a remote system 106, via an internet connection, and receive at least text from remote system 106, as shown with arrow 107.

In another example embodiment an electronic digital sample comprises a plurality of seconds of infrasonic, ultrasonic, infrared, ultraviolet and tactile waves portions in one-second increments, creating a digital fingerprint of the sample. Portable text display device 104 is also configured to send the electronic digital sample and any time code to a remote system 106, via an internet connection, and receive at least text from remote system 106, as shown with arrow 107.

Remote system 106 comprises a database of text files and associated digital fingerprints. Remote system 106 is configured to receive the digital fingerprint of the audio sample of audio portion 103, sent by portable text display device 104. Remote system 106 is configured to compare the digital fingerprint of the audio sample with the digital fingerprints of full audio signal associated with text file.

In another example embodiment, the remote system comprises a database of text files and associated digital fingerprints. Remote system 106 is configured to receive the digital fingerprint of the sample of the portion 103, sent by portable text display device 104. Remote system 106 is configured to compare the digital fingerprint of the sample with the digital fingerprints of signal associated with text file.

In one aspect of the present disclosure, remote system 106 is configured to synchronize the text in the associated file with media production 102. Remote system 106 may synchronize the text with media production 102 by locating the digital fingerprint of the sample within the fingerprint of the media production associated with the text file and sending the text to portable text display device 104 based upon the time elapsed since the receipt of the digital fingerprint of the sample or a time stamp of the sample, which may be sent by portable text display device 104.

In one aspect of the present disclosure, remote system 106 is configured to synchronize the text in the associated file with media production 102. In one example embodiment, the remote system 106 synchronizes the text with media production 102 by locating the digital fingerprint of the electronic digital sample within the fingerprint associated with the text file and sending the text to portable text display device 104 based upon the time elapsed since the receipt of the digital fingerprint of the electronic digital sample or a time stamp of the electronic digital sample, which may be sent by portable text display device 104.

In another aspect of the present disclosure, a digital fingerprint of the electronic digital sample is periodically sent by portable text display device 104 to remote system 106. In this aspect, remote system 106 is configured to check and adjust the synchronization of text being sent to portable text display device 104, thus increasing the level of synchronization of the text being sent by remote system 106 for immediate display on portable text display device 104.

In yet another aspect of the present disclosure, portable text display device 104 may be configured to synchronize the text being displayed therewith with the audio portion 103 of media production 102. For example, remote system 106 may be configured to send a block of text or the entire text file associated with the identified audio signal. In this aspect, the text being sent to portable text display device 104 has a digital fingerprint and/or time code of the text sent therewith.

The digital fingerprint may be a digital sound wave fingerprint, a time coded fingerprint, or a combination thereof. In this aspect, portable text display device 104 is configured to synchronize the text in the text received from remote system 106 by comparing digital fingerprints of sample(s) of audio portion 103, by time, or a combination thereof. In this aspect, portable text display device 104 may be configured to check and adjust the synchronization of text being displayed therewith by periodically sampling audio portion 103 and comparing with the digital fingerprint of audio associated with the text sent by remote system 106. Between samples, text may be displayed with the portable text display device 104.

In another example embodiment, the digital fingerprint is a digital wave fingerprint, a time coded fingerprint, or a combination thereof. The digital fingerprint includes ultrasonic, infrasonic, infrared, ultraviolet and tactile waves. In this aspect, portable text display device 104 is configured to synchronize the text in the text received from remote system 106 by comparing digital fingerprints of sample(s) 103, by time, or a combination thereof. In this aspect, portable text display device 104 may be configured to check and adjust the synchronization of text being displayed therewith by periodically sampling the electronic digital portion 103 and comparing with the digital fingerprint of associated with the text sent by remote system 106. Between samples, text may be displayed with the portable text display device 104.

Figure 2:
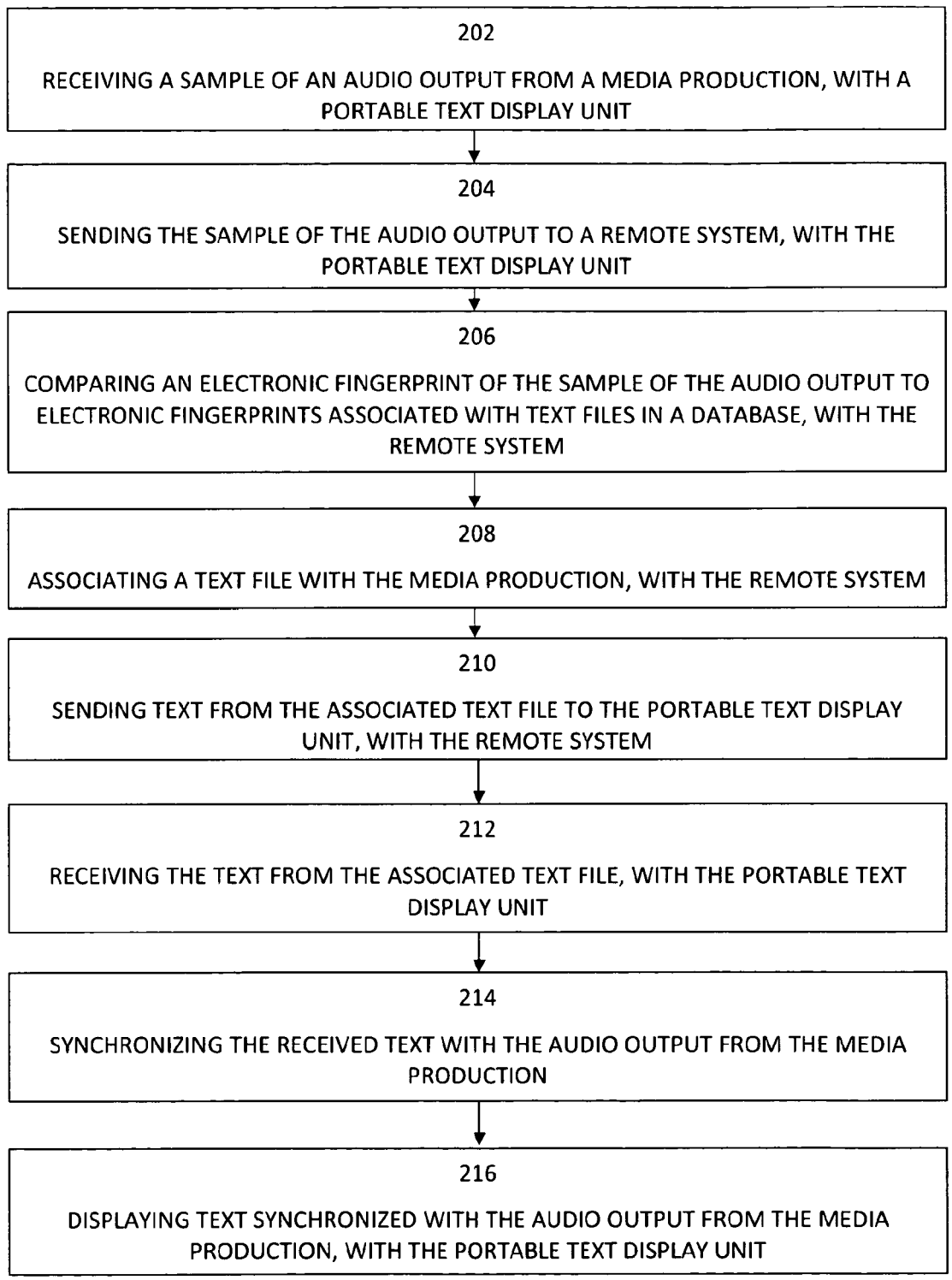
FIG. 2 is a flow chart illustrating an example embodiment of the manner in which subtitles of a media production are displayed on a portable text display device.

FIG. 2 shows a method for displaying subtitles on a portable text display device. For simplicity, FIG. 2 begins with the assumption that user has already connected their portable text display device to a remote system, and that the user's account, if any, is generally established. Proceeding then as indicated in FIG. 2, the user receives a sample of audio output from a media production at step 202. This may be done by simply receiving the audio output from the media production with a microphone that may be a component part of the portable text display device.

The audio sample may comprise a second or more, in one-second increments, of audio from the media production. Alternatively, the audio sample may comprise one or more segments of a sound wave or electronic digital fingerprint of the audio from the media production. The portable text display device then sends the audio sample to a remote system at step 204. The portable text display device may also send a time code associated with the audio sample, depending upon the synchronization method used. The portable text display device may be wirelessly connected to the Internet and the audio sample may be automatically sent upon receiving at step 202. The audio sample may be sent as an electronic digital fingerprint in a digital waveform, at step 204.

The remote system comprises a database of text files and associated electronic digital fingerprints. The associated electronic digital fingerprints of the text files may be in a digital waveform. Upon receiving the audio sample by the remote system, the electronic digital fingerprint of the sample is compared with the electronic digital fingerprints associated with text files in the database at step 206. Upon matching the electronic digital fingerprint of the audio sample with portion of an electronic digital fingerprint associated with a text file in the database, the text file is associated with the media production at step 208. Additionally, a time or position within the associated text may be reported for synchronization at step 214.

Text from the associated text file is sent from the remote system to the portable text display device at step 210. The text sent may be a portion of the associated text file or the whole associated text file, depending upon the method of synchronization used at step 214. The text may be automatically sent by the remote system, wirelessly through the Internet, to the portable display device at step 210. The text sent by the remote system at step 210 is received with the portable text display device at step 212. The received text is synchronized with the audio output from the media production at step 214. The method concludes at step 216 wherein the text synchronized with the media production is displayed to the user with the portable display device.

Figure 3:
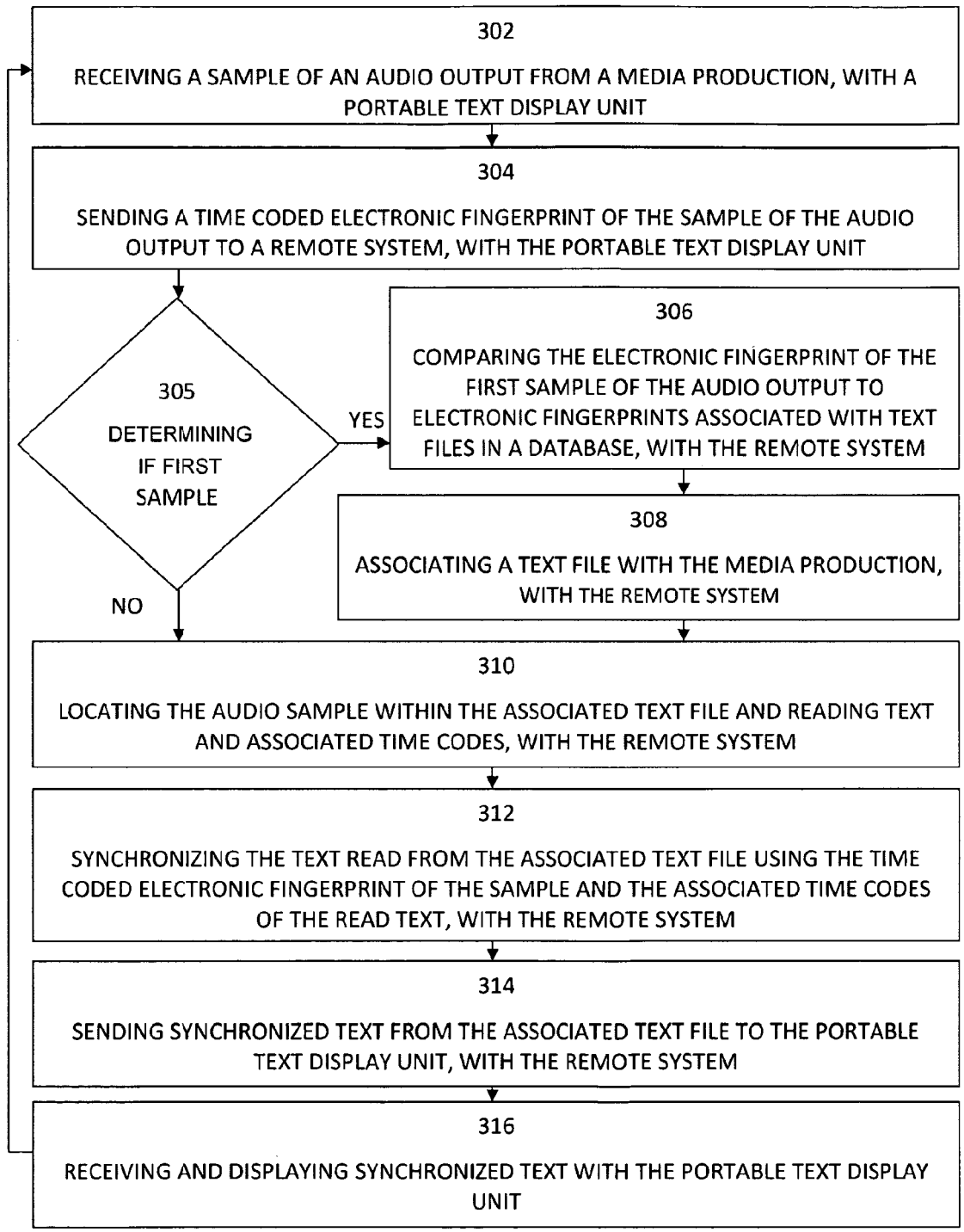
FIG. 3 is a flow chart illustrating an example embodiment of the manner in which text in a text file is synchronized with a media production, wherein synchronization is carried out with a system remote from a portable text display device.
Figure 4:
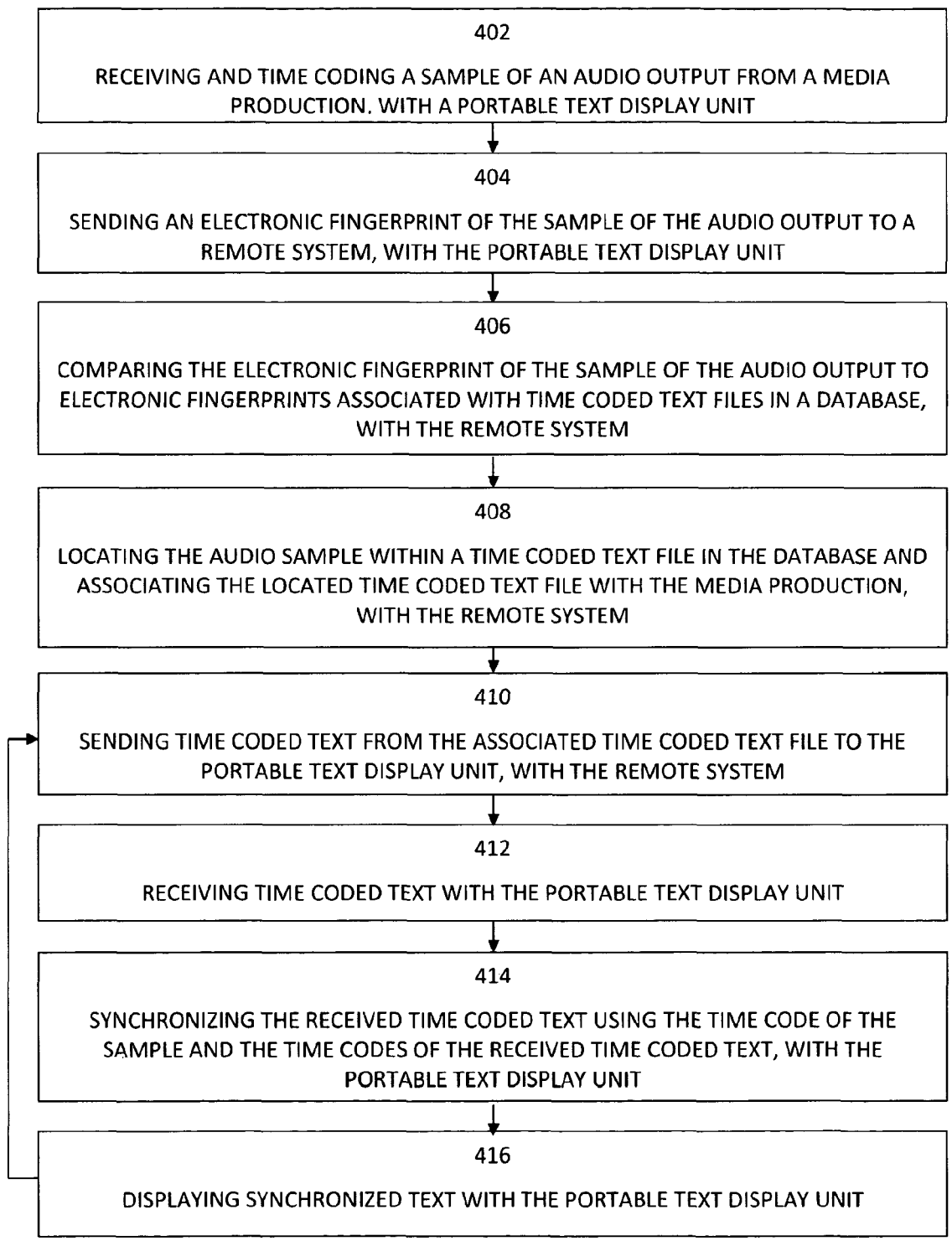
FIG. 4 is a flow chart illustrating an example embodiment of the manner in which text in a text file is synchronized with a media production, wherein synchronization is carried out with a portable text display device.

Steps 202 through 216 may be performed in various orders and one or more steps may be repeated, depending on the synchronization method used. This is shown with FIG. 3 and FIG. 4, showing examples of sending, receiving, synchronizing, and displaying text.

Figure 2A:
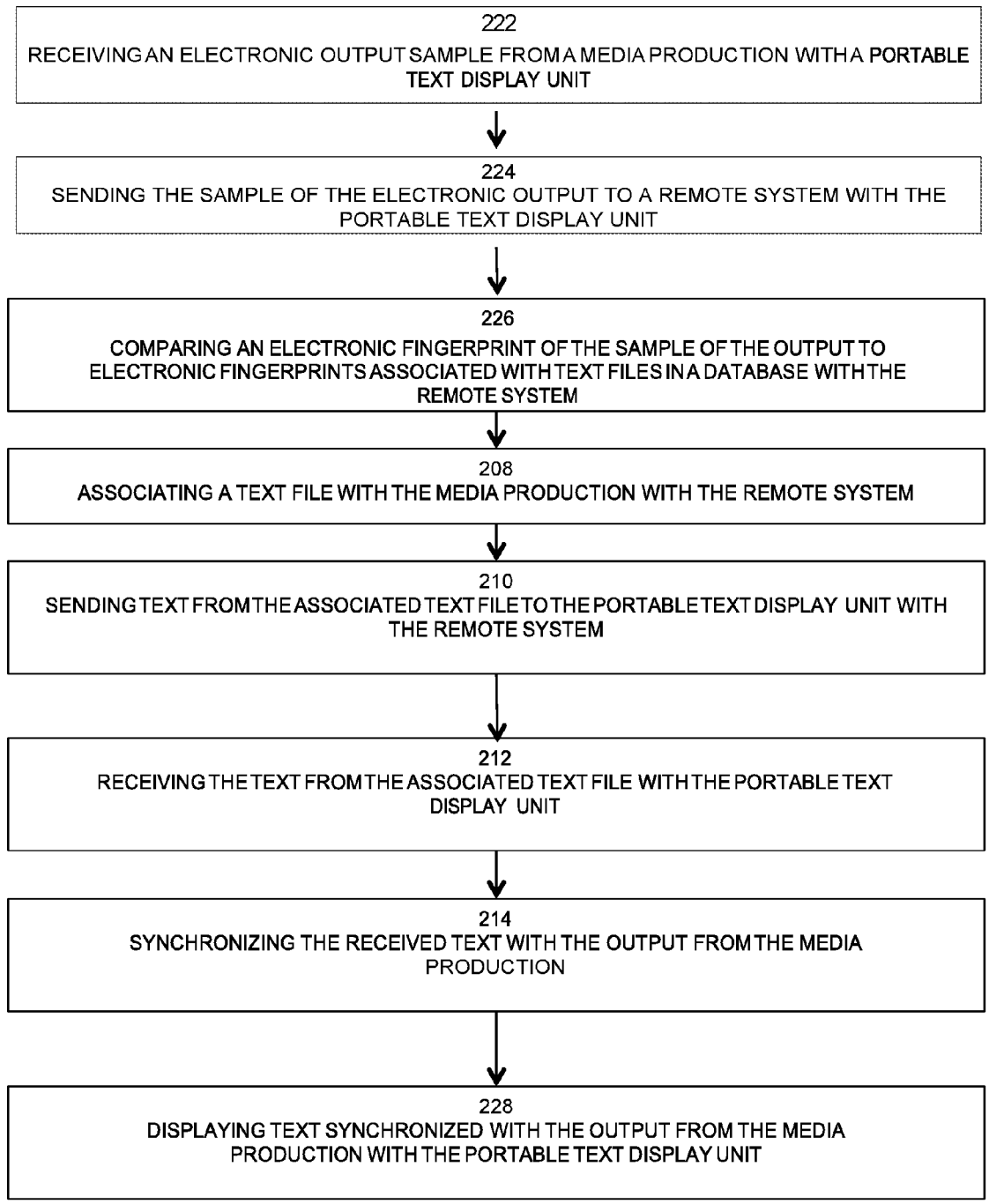
FIG. 2A is a flow chart illustrating another example embodiment of the manner in which subtitles of a media production are displayed on a portable text display device.

FIG. 2A shows another example embodiment of a method for displaying subtitles on a portable text display device. Proceeding then as indicated in FIG. 2, the user receives a sample of an electronic digital output from a media production at step 222. This may be done by simply receiving the ultrasonic, infrasonic, ultraviolet, infrared or tactile output from the media production with a microphone or other electromagnetic detectors, which is a component part of the portable text display device.

The sample comprises a plurality of seconds in one-second increments, of wave signals from the media production. The portable text display device then sends the electronic digital sample to a remote system at step 224. The portable text display device may also send a time code associated with the sample, depending upon the synchronization method used. The portable text display device may be wirelessly connected to the Internet and the sample may be automatically sent upon receiving at step 222. In one example embodiment, the sample is sent as an electronic digital fingerprint in a digital waveform, at step 224.

The remote system comprises a database of text files and associated electronic digital fingerprints. The associated electronic digital fingerprints of the text files may be in a digital waveform. Upon receiving the sample by the remote system, the electronic digital fingerprint of the sample is compared with the electronic digital fingerprints associated with text files in the database at step 226. Upon matching the electronic digital fingerprint of the sample with portion of an electronic digital fingerprint associated with a text file in the database, the text file is associated with the media production at step 208. Additionally, a time or position within the associated text may be reported for synchronization at step 214.

Text from the associated text file is sent from the remote system to the portable text display device at step 210. The text sent may be a portion of the associated text file or the whole associated text file, depending upon the method of synchronization used at step 214. The text may be automatically sent by the remote system, wirelessly through the Internet, to the portable display device at step 210. The text sent by the remote system at step 210 is received with the portable text display device at step 212. The received text is synchronized with the output from the media production at step 214. The method concludes at step 216 wherein the text synchronized with the media production is displayed to the user with the portable display device.

Steps 222 through 216 may be performed in various orders and one or more steps may be repeated, depending on the synchronization method used. This is shown with FIGS. 3, 3A, 4 and 4A, showing examples of sending, receiving, synchronizing, and displaying text.

FIG. 3 shows an aspect of a method that may be incorporated into the present example embodiment. In this aspect, remote system 106 synchronizes text associated with media production 102 and portable text display device 104 displays the synchronized text to user 108 upon receiving the synchronized text.

For simplicity, FIG. 3 begins with step 302 where the user receives a sample of audio output from a media production. The received sample is time coded and an electronic digital fingerprint of the sample along with the time code is sent to a remote system at step 304. Steps 302 and 304 may be carried out by the user by using a microphone on the portable text display device and a time stamp may be automatically generated with the portable display device prior to sending to the remote system.

The remote system comprises a database of text files with associated electronic digital fingerprints and/or time codes. Upon receiving the time coded electronic digital fingerprint by the remote system, the remote system determines if this is a first sample sent by the user or a subsequent sample at step 305. It is important to note that more than one sample may be taken of a media production to adjust or resynchronize text by the remote system. In the event the audio sample is a first or only sample being sent by the portable text display device to the remote system, the remote system compares the electronic digital fingerprint of the sample with electronic digital fingerprints associated with text files within a database at step 306. Upon matching the electronic digital fingerprint of the first or only sample of the audio output from the media production with an electronic digital fingerprint associated with text file in the database, the remote system associates the matched text file with the media production at step 308.

Each audio sample sent by the portable text display device to the remote system is located in the associated text file at step 310, with the remote system. Text with associated time codes is read from the associated text file, with the remote system at step 310. At step 312, the text read from the associated text file is synchronized with the audio output of the media production. Synchronization is carried out with the remote system by synchronizing the time code of the received electronic digital fingerprint of the sample, sent at step 304, with the time codes associated with the text in the associated text file. For example, the portable display device may send a sample of audio output with a time code or the remote system may time code the received sample. Upon locating and reading the audio sample within the associated text file in the database, the remote system may synchronize text for sending to the portable display device by using the time code of the sample, the time codes associated with the text file, and factoring in any elapsed time.

Upon synchronizing the text in the text file at step 312 the text may be sent to the portable text device at step 314. As the text is received by the portable text display device, it may be immediately displayed to the user at step 316.

Subsequent samples of the audio output may be taken with the portable text display device to adjust or resynchronize the sending of text by the remote system to the portable display device. In an aspect where synchronization is checked and adjusted if needed, steps 302, 304, and 310 through 314 may be repeated while the portable display device is displaying text at step 316.

Figure 3A:
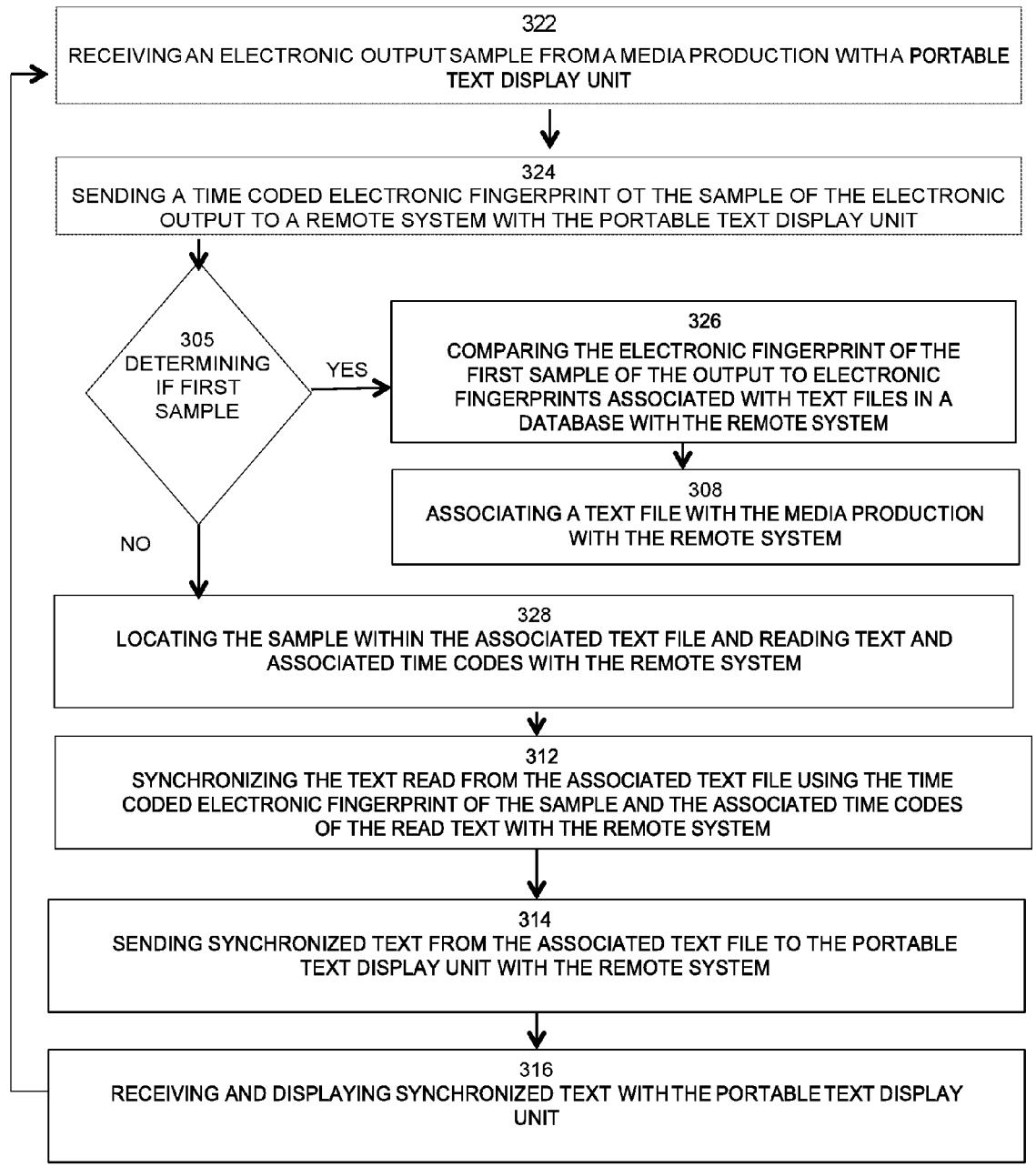
FIG. 3A is a flow chart illustrating another example embodiment of the manner in which text in a text file is synchronized with a media production, wherein synchronization is carried out with a system remote from a portable text display device.

FIG. 3A shows another aspect of a method that may be incorporated into the present example embodiment. In this aspect, remote system 106 synchronizes text associated with media production 102 and portable text display device 104 displays the synchronized text to user 108 upon receiving the synchronized text.

For simplicity, FIG. 3A begins with step 322 where the user receives a sample of electronic digital output from a media production. The received sample is time coded and an electronic digital fingerprint of the sample along with the time code is sent to a remote system at step 324. In one example embodiment, steps 322 and 324 is carried out by the user by using a microphone, a transducer or an electromagnetic radiation detector, on the portable text display device and a time stamp may be automatically generated with the portable display device prior to sending to the remote system.

The remote system comprises a database of text files with associated electronic digital fingerprints and/or time codes. Upon receiving the time coded electronic digital fingerprint by the remote system, the remote system determines if this is a first sample sent by the user or a subsequent sample at step 305. It is important to note that more than one sample may be taken of a media production to adjust or resynchronize text by the remote system. In the event the sample is a first or only sample being sent by the portable text display device to the remote system, the remote system compares the electronic digital fingerprint of the sample with electronic digital fingerprints associated with text files within a database at step 326. Upon matching the electronic digital fingerprint of the first or only sample from the media production with an electronic digital fingerprint associated with text file in the database, the remote system associates the matched text file with the media production at step 308.

Each sample sent by the portable text display device to the remote system is located in the associated text file at step 328, with the remote system. Text with associated time codes is read from the associated text file, with the remote system at step 328. At step 312, the text read from the associated text file is synchronized with the output of the media production. Synchronization is carried out with the remote system by synchronizing the time code of the received electronic digital fingerprint of the sample, sent at step 324, with the time codes associated with the text in the associated text file. For example, the portable display device may send a sample with a time code or the remote system may time code the received sample. Upon locating and reading the sample within the associated text file in the database, the remote system may synchronize text for sending to the portable display device by using the time code of the sample, the time codes associated with the text file, and factoring in any elapsed time.

Upon synchronizing the text in the text file at step 312 the text may be sent to the portable text device at step 314. As the text is received by the portable text display device, it may be immediately displayed to the user at step 316.

Subsequent samples of the output may be taken with the portable text display device to adjust or resynchronize the sending of text by the remote system to the portable display device. In an aspect where synchronization is checked and adjusted if needed, steps 322, 324, 326, 328 and 312 through 314 may be repeated while the portable display device is displaying text at step 316.

FIG. 4 shows an aspect of a method that may be incorporated into the present example embodiment wherein synchronization of text with audio output from a media production is carried out with a portable text display device. In this aspect, portable display device 104 synchronizes text associated with media production 102. FIG. 4 begins with step 402 where the user receives a sample of audio output from a media production. The received sample is electronic digitally fingerprinted and sent to a remote system at step 404.

The remote system comprises a database of text files and associated electronic digital fingerprints with time codes. Upon receiving the electronic digital fingerprint by the remote system, the remote system compares the electronic digital fingerprint of the sample with electronic digital fingerprints associated with time coded text files within a database at step 406. Upon matching the electronic digital fingerprint of the electronic digital sample of the audio output from the media production with a fingerprint associated with a text file in the database, the remote system associates the matched text file with the media production and locates the audio sample within the electronic digital fingerprint of the associated text file, at step 408.

The remote system sends time-coded text from the associated text file to the portable display device at step 410. The text sent at step 410 may comprise the whole associated time coded text file, a portion of the associated time coded text file located in time after the time of the location of the audio sample within the text file, or only a block of the text file. The time-coded text sent with the remote system at step 410 is received with the portable display device at step 412.

The portable text display device synchronizes the received text at step 414. Synchronization may be carried out by using the time at which the time coded sample was taken at step 402, the time codes associated with the received text, and elapsed time. Alternatively or additionally, further samples of the audio output may be taken with the portable text display device and compared with electronic digital fingerprints associated with the time-coded text, with the portable text display device. Upon synchronization of the text in the received time coded text, the portable text display device displays the text to the user providing subtitles for the media production, at step 416. If only a portion or block of the time coded text file is sent by the remote system at step 410, additional time coded text may be sent and displayed by repeating steps 410 through 416 until the media production concludes.

Figure 4A:
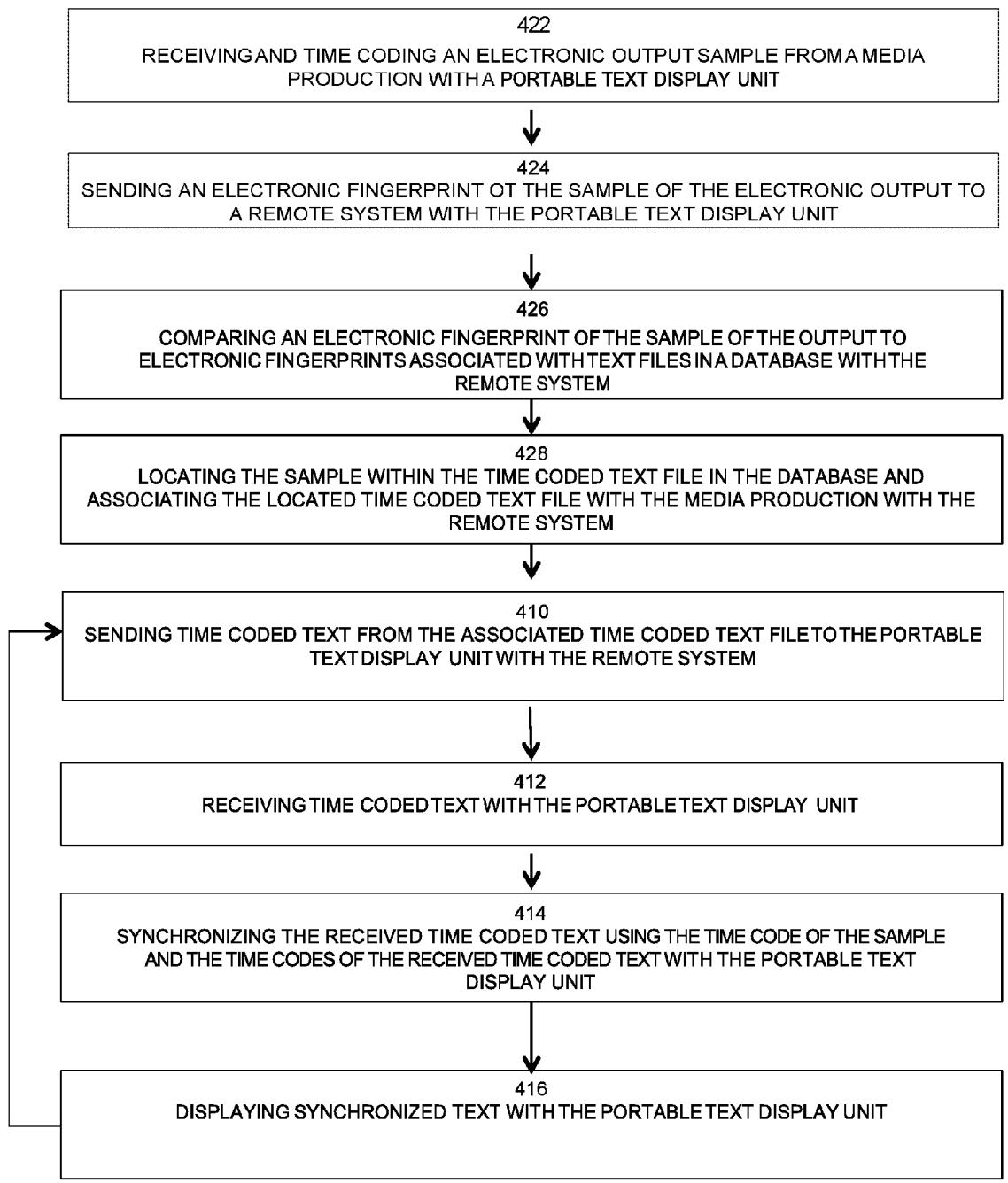
FIG. 4A is a flow chart illustrating another example embodiment of the manner in which text in a text file is synchronized with a media production, wherein synchronization is carried out with a portable text display device.

FIG. 4A shows another example embodiment of a method wherein synchronization of text with output from a media production is carried out with a portable text display device. In this aspect, portable display device 104 synchronizes text associated with media production 102. FIG. 4A begins with step 422 where the user receives an electronic digital output sample from a media production. The received sample is electronic digitally fingerprinted and sent to a remote system at step 424.

The remote system comprises a database of text files and associated electronic digital fingerprints with time codes. Upon receiving the electronic digital fingerprint by the remote system, the remote system compares the electronic digital fingerprint of the sample with electronic digital fingerprints associated with time coded text files within a database at step 426. Upon matching the electronic digital fingerprint of the electronic digital output sample from the media production with a fingerprint associated with a text file in the database, the remote system associates the matched text file with the media production and locates the sample within the electronic digital fingerprint of the associated text file, at step 428.

The remote system sends time-coded text from the associated text file to the portable display device at step 410. The text sent at step 410 may comprise the whole associated time coded text file, a portion of the associated time coded text file located in time after the time of the location of the sample within the text file, or only a block of the text file. The time-coded text sent with the remote system at step 410 is received with the portable display device at step 412.

The portable text display device synchronizes the received text at step 414. Synchronization may be carried out by using the time at which the time coded sample was taken at step 422, the time codes associated with the received text, and elapsed time. Alternatively or additionally, further samples of the electronic digital output may be taken with the portable text display device and compared with electronic digital fingerprints associated with the time-coded text, with the portable text display device. Upon synchronization of the text in the received time coded text, the portable text display device displays the text to the user providing subtitles for the media production, at step 416. If only a portion or block of the time coded text file is sent by the remote system at step 410, additional time coded text may be sent and displayed by repeating steps 410 through 416 until the media production concludes.

Figure 5:
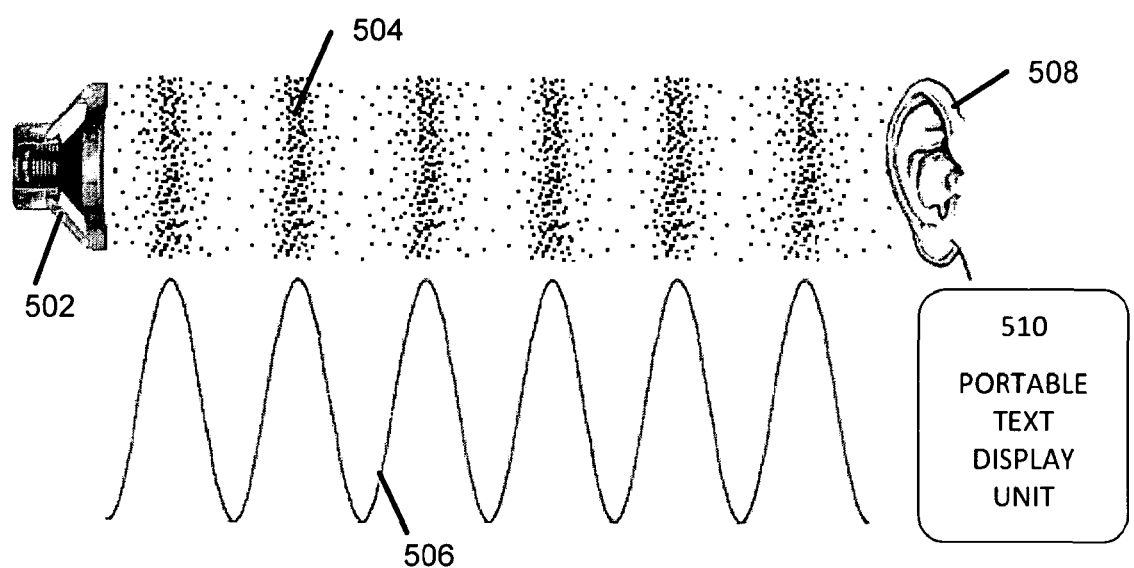
FIG. 5 is an illustration showing the interconnection between the user, the media production, and the portable text display device.

FIG. 5 shows the interconnection between the user 508, the media production 502, and the portable text display device 510. The media production 502 has at least one portion that produces variations in air pressure 504 or sound waves 506. Sound waves 506 are corresponding waveforms of the variations in air pressure 504, illustrating the manner which portable text display device 510 receives the portion of the media production with a microphone. User 508 and portable text display device 510 simultaneously hear or receive the output of the media production. At the same time, user 508 is visually shown text, in the form of subtitles, with portable text display device 510.

Figure 6:
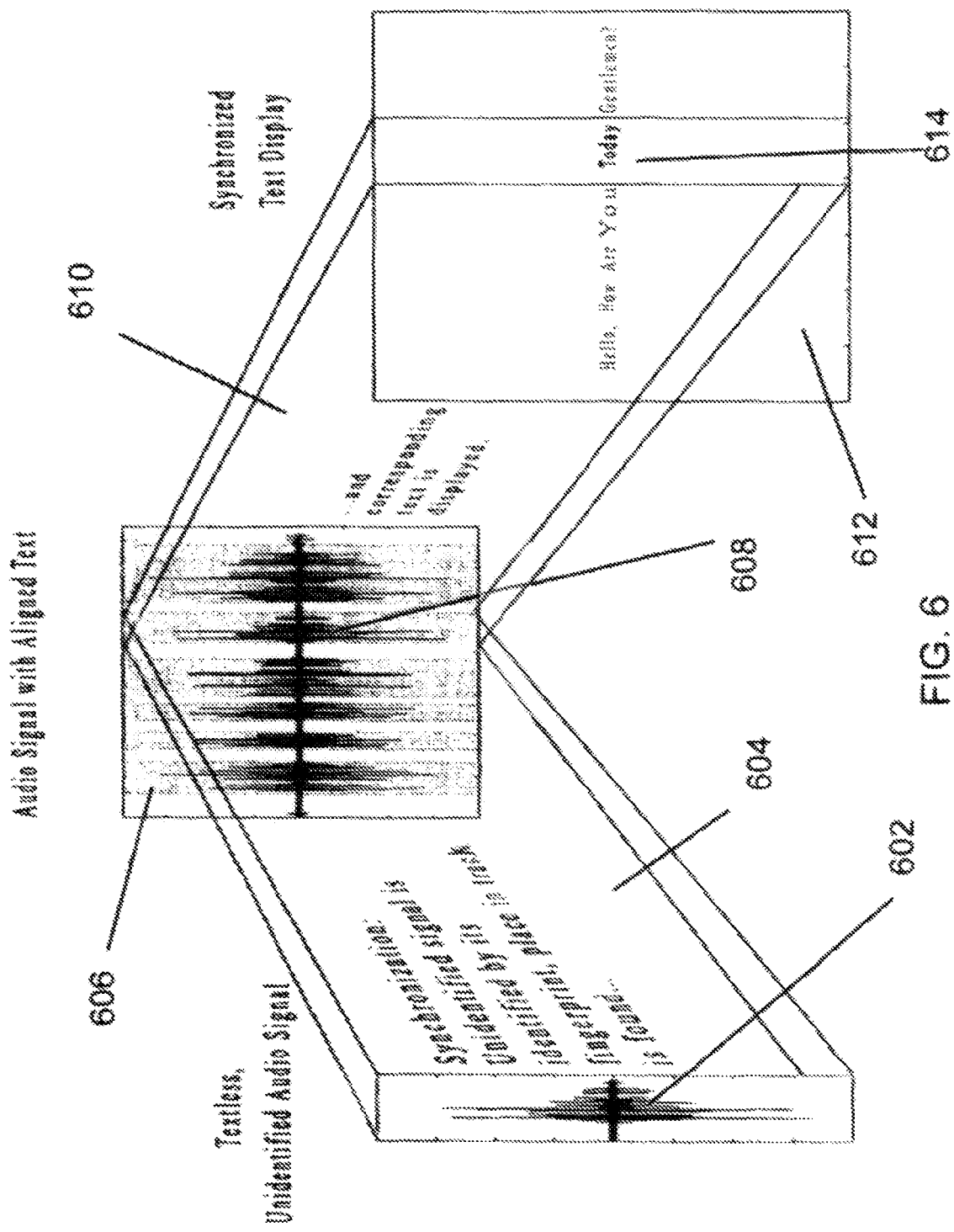
FIG. 6 is an illustration of an example embodiment of the synchronization of text within a text file with the audio from a media production.

FIG. 6 shows an aspect of a method for synchronizing text within a text file with the audio from a media production. Electronic digital fingerprinting of sound and text in this aspect is accomplished with wave form(s). Wave form(s) 602 are received from a media production with a portable text display device and sent to a remote system as shown with 604. The remote system compares the wave form(s) 602 with waveforms in a database wherein each waveform in the database has associated text. The remote system associates an electronic digitally coded text file with the media production. Electronic digitally coded text file 606 has been associated with waveform 602.

Synchronization of text in electronic digitally coded text file 606 may be carried out with a portable display device or a remote system. At least one waveform 602 is located within associated text file 606, as shown with waveform 608. Waveform 608 is representative of or is associated with the word "today" 614. In one aspect of the present disclosure, the word "today", or later text in text file 606, may be sent to the portable display device for immediate display as subtitle 612. Later text may be sent in the event there is a time lag between the remote system and the portable display device. This time lag may be calculated with a time code associated with a sample sent by the portable display device or a time which the remote system receives the sample. In this aspect, synchronized text is sent by the remote system to the portable display device as shown with 610 for immediate display as subtitle 612. The other text in subtitle 612 may be sent to the portable display device in accord with a time code associated with text file 606 and/or additional samples 602 may be sent to the remote system for locating within text file 606. In another aspect of the present disclosure, blocks of or the whole associated text file 606 may be sent to the portable display device for synchronization. The portable text display device may perform a similar method of synchronization of the text in text file 606 for display therewith by locating an electronic digital fingerprint of sampled text within the electronic digital fingerprint associated with text file 606, by timing, or by a combination locating fingerprints and timing.

Figure 7:
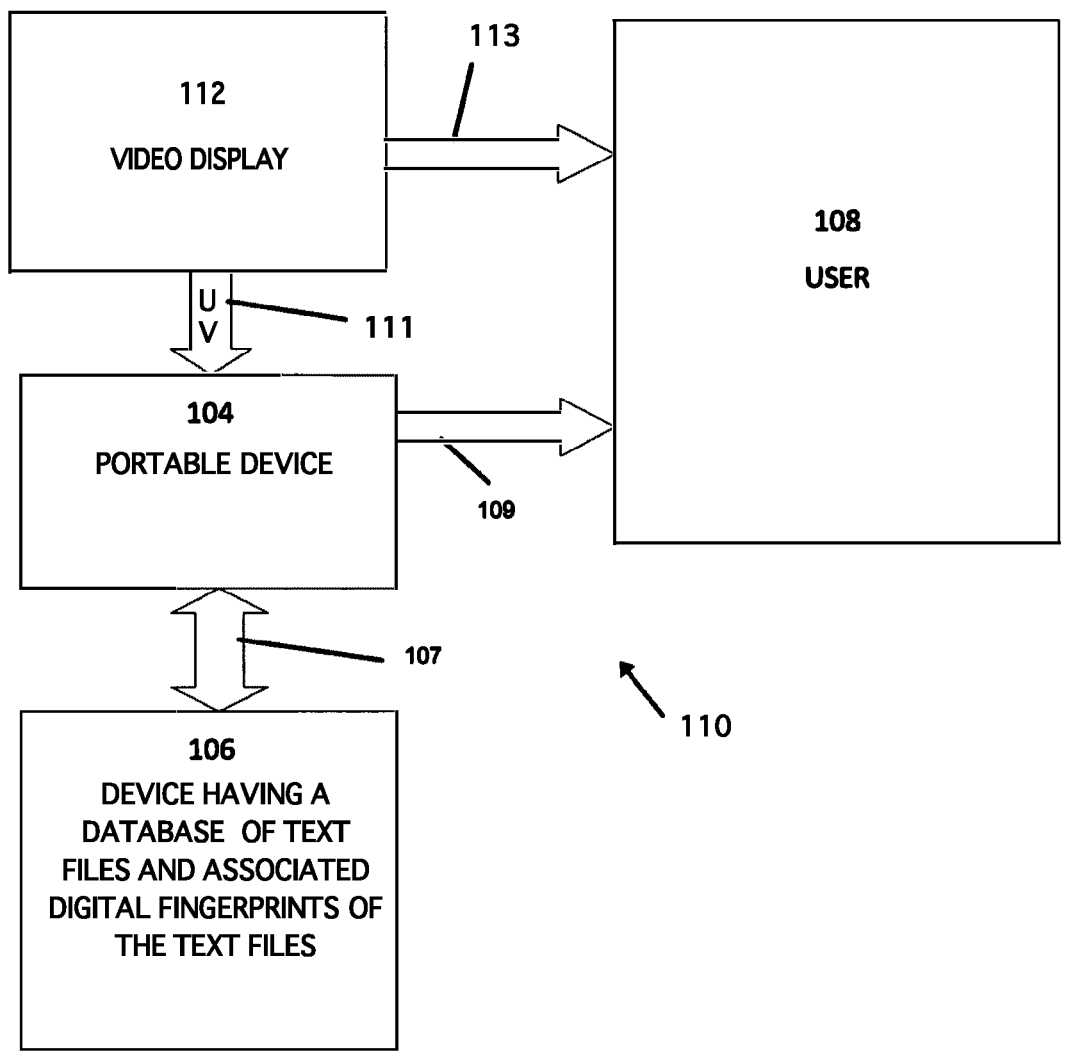
FIG. 7 is a block diagram of a further example embodiment, illustrating the functional interconnection of elements of the method and device according to the present disclosure.

FIG. 7 illustrates elements 110 of a method and device configured to display subtitles of a video display 112 of the media production or media stream to a user 108. Block 112 illustrates the video display that can include the audiovisual media production that is produced by streaming, downloading or receiving from a broadcast or narrowcast source. Arrow 113 designates the visible display portion 112 emitted and delivered to the user. The visible video portion 113 of the video display 112 is delivered to user 108 and invisible ultraviolet (UV) light 111 is delivered to the portable text display device 104 simultaneously.

In one example embodiment, the digital fingerprint characteristic that is extracted and digitized is the ultraviolet (UV) light 111 that is transmitted from the display of the video. The UV light 111 can be added to the video portion purposefully for creating a digital fingerprint and is emitted from the video display screen 112 or can be native to the signal and emitted with the video display 112. Both sources of UV light 111 from the video display 112 are capable of providing an identifying digital fingerprint of the video display. A sample of the UV light full digital fingerprint is captured and includes time data, the time data derived by comparing the sample digital fingerprint to a full digital fingerprint produced by said UV light 111.

Portable text display device 104 may be an electronic digital device such as a personal digital assistant (PDA), cell phone having text display capabilities, such as a "smartphone", tablet computer, "smart eyeglasses" or other portable electronic digital device that have screens for displaying text. In one example embodiment, the text display portable device 104 is provided with application software configured to provide the functionality of the portable text portable device 104 disclosed herein including sampling the UV light fingerprint and displaying text. In one example embodiment, the text display device 104 has a UV sensor for receiving UV light 111 from the video display on a second device 112, a display screen for displaying text to user 108 as shown with arrow 109, and a wireless internet connection, e.g. a wireless transmitter and receiver, for sending and receiving digital information from the device 106 having the databases shown with arrow 107, as explained hereinabove.

In one example embodiment of the portable text display device, the display screen for displaying text is a plurality of LED's light emitting diodes.

In one example, the portable text display device has a UV sensor in a camera integrated in the device, such as found in a smartphone or tablet computer.

Device 106 comprises a database of text files and associated digital fingerprints as described hereinabove. The device having the database 106 is configured to receive the sample digital fingerprint, sent by portable text display device 104. The device having the database 106 is configured to compare the digital fingerprint sample of the UV light with the digital fingerprints of full UV digital fingerprint associated with text file.

In one example embodiment, the device 106 having the database is remotely accessed through the Internet.

In one aspect of the present disclosure, the device having the database 106 is configured to synchronize the text in the associated file with the video display 112. The device having the database 106 may synchronize the text with media production 112 by locating the digital fingerprint of the sample within the fingerprint of the video display associated with the text file and sending the text to portable text display device 104 based upon the time elapsed since the receipt of the digital fingerprint of the sample or a time stamp of the sample, which may be sent by portable text display device 104.

In one aspect of the present disclosure, the device having the database 106 is configured to synchronize the text in the associated file with the video display. In one example embodiment, the device having the database 106 synchronizes the text with the video display 112 by locating the digital fingerprint of the electronic digital sample within the fingerprint associated with the text file and sending the text to portable text display device 104 based upon the time elapsed since the receipt of the digital fingerprint of the electronic digital sample or a time stamp of the electronic digital sample, which may be sent by portable text display device 104.

In another aspect of the present disclosure, a sample of the electronic digital fingerprint is periodically sent by portable text display device 104 to the device having the database 106, the sample sent preferably wirelessly. In this aspect, the device having the database 106 is configured to check and adjust the synchronization of text being sent to portable text display device 104, thus increasing the level of synchronization of the text being sent by the device having the database 106 for immediate display on portable text display device 104.

In yet another aspect of the present disclosure, portable text display device 104 may be configured to synchronize the text being displayed therewith with the video display 113 of media production 112. For example, the device having the database 106 may be configured to send a block of text or the entire text file associated with the identified audio signal. In this aspect, the text being sent to portable text display device 104 has a digital fingerprint and/or time code of the text sent therewith.

In this aspect, portable text display device 104 is configured to synchronize the text in the text received from the device having the database 106 by comparing at least one digital fingerprint sample of the visual display, by time, or a combination thereof. In this aspect, portable text display device 104 may be configured to check and adjust the synchronization of text being displayed therewith by periodically sampling the UV light and comparing with the digital fingerprint of UV light associated with the text sent by the device having the database 106. Between samples, text may be displayed with the portable text display device 104.

Figure 8:
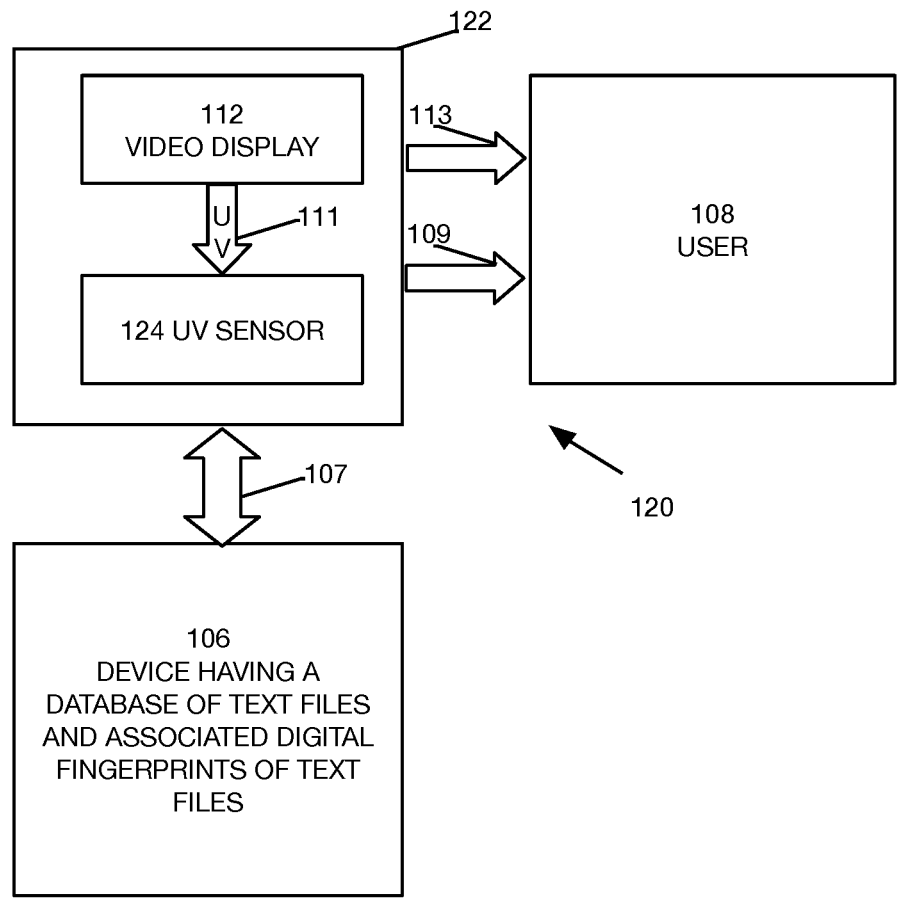
FIG. 8 is a block diagram of another example embodiment, illustrating the functional interconnection of elements of the method and device according to the present disclosure.

FIG. 8 illustrates elements 120 of another method and another device configured to display subtitles of a video display 112 of the media production or media stream to a user 108. Block 122 illustrates the device having the video display that can include the audiovisual media production that is produced by streaming, downloading or receiving from a broadcast or narrowcast source. The device further has a UV sensor 124 capable of detecting UV light 111 from the video display shown on the device. Arrow 113 designates the visible display portion 112 emitted and delivered to the user. The visible video portion 113 of the video display 112 is delivered to user 108 and invisible ultraviolet (UV) light 111 is delivered to the portable text display device 104 simultaneously as explained hereinabove.

In one example embodiment, the digital fingerprint characteristic that is extracted and digitized is the ultraviolet (UV) light 111 is transmitted from the display of the video. The UV light 111 can be added to the video portion purposefully for creating a digital fingerprint and is emitted from the video display screen 112 or can be native to the signal and emitted with the video display 112 as explained hereinabove.

Portable text display device 104 may be an electronic digital device such as a personal digital assistant (PDA), cell phone having text display capabilities, such as a "smartphone", tablet computer, "smart eyeglasses" or other portable electronic digital device that have screens for displaying text. In one example embodiment, the text display portable device 104 is provided with application software configured to provide the functionality of the portable text portable device 104 disclosed herein including sampling the UV light fingerprint and displaying text. In one example embodiment, the text display device 104 has a UV sensor for receiving UV light 111 from the video display screen 112, a display screen for displaying text to user 108 as shown with arrow 109, and a wireless internet connection, e.g. a wireless transmitter and receiver, for sending and receiving digital information from the device 106 having the databases shown with arrow 107, as explained hereinabove. The text and video may be displayed on the same display screen simultaneously. The device 106 having a database of text files operates as explained hereinabove.

In one example embodiment of the portable text display device, the display screen for displaying text is a plurality of LED's light emitting diodes.

In one example, the portable text display device has a UV sensor in a camera integrated in the device, such as found in a smartphone or tablet computer.

Figure 9:
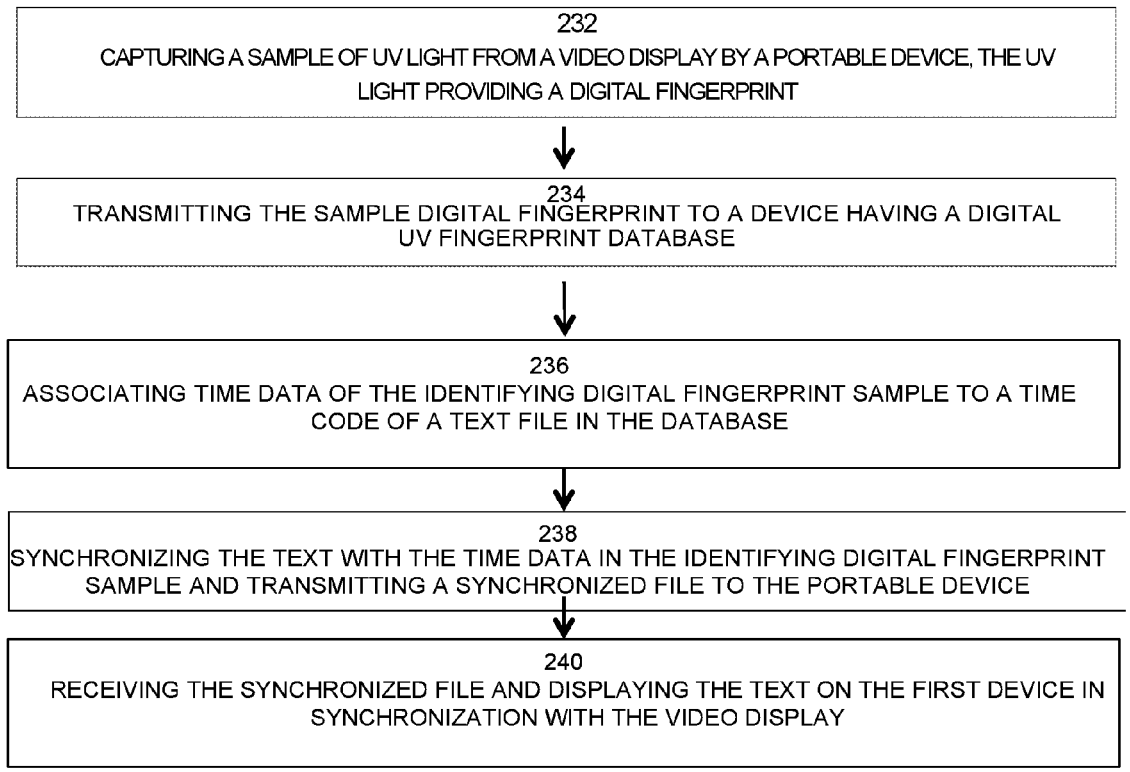
FIG. 9 is a flow chart illustrating a further example embodiment of the manner in which subtitles of a video are displayed on a portable text display device.

FIG. 9 shows a flow chart illustrating a further example embodiment of the manner in which subtitles of a video are displayed on a portable text display device. In block 232, the process starts with the portable device, said first device capturing the sample of UV light emitted from a video display showing on a screen on a second device, the UV light providing an identifying digital fingerprint of the video display. As explained hereinabove, the captured sample of UV light includes time data derived by comparing the sample digital fingerprint to a full digital fingerprint produced by said UV light. As explained hereinabove the portable device has an ultraviolet (UV) light sensor.

In one example embodiment, the portable device has both the video display and an ultraviolet light sensor as explained in FIG. 8 hereinabove.

In block 234, the portable device transmits the UV light digital fingerprint sample transmitting to a third device, the third device hosting a database containing a plurality of text files, each text file associated with a time code.

In block 236, the third device associates the time data of the identifying digital fingerprint sample to a time code of a text file in the database.

In block 238, the third device synchronizes the text with the time data in the identifying digital fingerprint sample and transmits the synchronized file to the first portable device.

In block 240, the first portable device receives the synchronized file and displays the text on the first portable device in synchronization with the video display as the second device produces the video display.

Block 238 and 240 may be repeated periodically to maintain the synchronization of the text and the video display.

Figure 10:
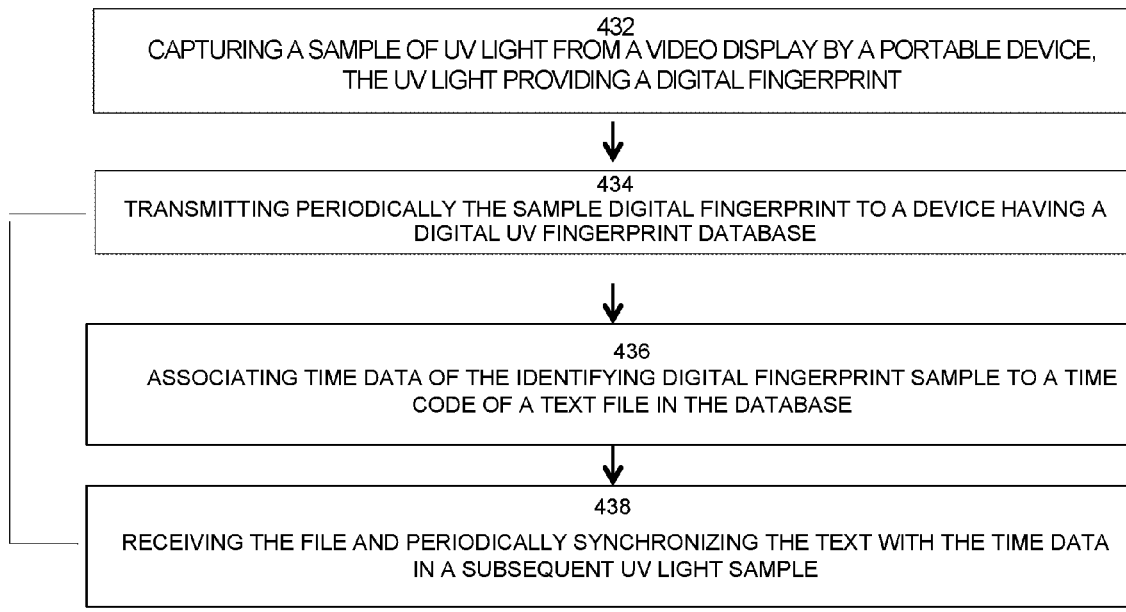
FIG. 10 is a flow chart illustrating another example embodiment of the manner in which text in a text file is periodically synchronized with a video when text is displayed on a portable text display device.

FIG. 10 shows a flow chart illustrating yet a further example embodiment of the manner in which subtitles of a video are displayed on a portable text display device.

In block 432, the portable device having a UV light sensor captures the sample of UV light emitted from a video display showing on a screen on a second device, said UV light providing an identifying digital fingerprint of the video display. The captured sample of UV light includes time data derived by comparing the sample digital fingerprint to a full digital fingerprint produced by the UV light.

In block 434, the portable device periodically transmits the identifying digital fingerprint sample having time data to a third device. The third device hosts a database containing a plurality of text files, each text file associated with a time code.

Shown in block 436, the third device that hosts the database associates time data of the identifying digital fingerprint sample to a time code of a text file in the database, the database containing text files for a plurality of videos.

In block 438, the portable device receives the file and periodically synchronizes the text with the time data in a subsequent UV light sample from the second device when displaying the text on the first device as the second device produces the video display.

The disclosed embodiments may individually and/or collectively be components of a larger system, wherein other procedures may take precedence over or otherwise modify their application. Also, a number of steps may be required before, after, and/or concurrently with the following embodiments.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic digital, magnetic, optical, electromagnetic, infrared, or semiconductor system, apparatus, or device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure can be written in any combination of one or more programming languages. The program code may execute entirely on the user's computer, partly on the user's computer, as a stand-alone software package, partly on the user's computing device and partly on a remote computing device or entirely on the remote computing device. In the latter scenario, the remote computing device may be connected to the user's computing device through any type of network, including a local area network (LAN) or a wide area network (WAN), or the connection may be made to an external computing device (for example, through the Internet using an Internet Service Provider).

The computing device for carrying out operations for aspects of the present disclosure can be, but is not limited to, a mainframe computer, a server, a desktop computer, a laptop computer, a tablet computer, a smart phone or a handheld digital device.

Aspects of the present disclosure are described below with reference to flowchart illustrations and/or block diagrams of methods, systems and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

While the preferred embodiment to the disclosure had been described, those skilled in the art, both now and in the future, may make various improvements and/or enhancements, which fall within the scope of the claims which follow. These claims should be construed to maintain the proper protection for the disclosure first described.

In conclusion, herein is presented a method and device for synchronizing text with a media production and displaying the text on a portable display device, thereby providing subtitles for the media production. The portable display device is configured to receive audio from the media production and send an electronic digital code of an audio sample to a remote system. The remote system is configured to receive the electronic digitally coded sample and locate and associate a text file with the media production. At least one of the remote system and the portable text display device is configured to synchronize the text in the associated text file with the media production. The portable text display device is configured to receive text from the associated text file and display it to a user thereby providing the user with subtitles of the media production.

The disclosure is illustrated by example in the drawing figures, and throughout the written description. It should be understood that numerous variations are possible, while adhering to the inventive concept. Such variations are contemplated as being a part of the present disclosure.

What is claimed is:

1. A method for displaying subtitles on a portable device, comprising:
   capturing by a first portable device having an ultraviolet (UV) light sensor;
   sampling UV light stream, the UV light emitted from a video display on a second device screen;
   identifying digital fingerprint of the video display based on the UV light;
   deriving the time data by comparing the digital fingerprint sample to a full digital fingerprint produced by the UV light;
   transmitting from the first portable device the identifying digital fingerprint sample having time data to a third device, the third device hosting a database containing a plurality of text files for a plurality of videos, each text file associated with a time code;
   associating time data of the identifying digital fingerprint sample to a time code of a text file in the database on the third device;
   synchronizing the text file with time data, the time data based on fingerprint sample of the UV light associated with the display on a second device screen and transmitting a synchronized file to the first portable device, the synchronized file having text synchronized with the video display shown on a screen on the second device; and
   receiving the synchronized file and displaying the text on the first portable device in synchronization with the video display of the second device.

2. A method for displaying subtitles on a portable device, comprising:
   capturing by a first portable device having an ultraviolet (UV) light sensor and a display screen;
   sampling ultraviolet (UV) light stream, the UV light emitted from a video display showing on the first device display screen;
   identifying digital fingerprint of the video display based on the UV light;
   deriving the time data by comparing the sample digital fingerprint to a full digital fingerprint produced by the UV light;
   transmitting from the first portable device the sample identifying digital fingerprint having time data to a second device, the second device hosting a database containing a plurality of text files, each text file associated with a time code;
   associating time data of the identifying digital fingerprint sample to a time code of a text file in the database on the second device, the database containing text files for a plurality of videos;
   synchronizing the text file with time data, the time data based on fingerprint sample of the UV light associated with the display on a first device screen and transmitting a synchronized file to the first portable device, the synchronized file having text synchronized with the video display shown on a screen on the first device; and
   receiving the synchronized file and displaying the text on the first portable device during the display of the video on the first portable device.

3. A method for displaying subtitles on a portable device, comprising:
- capturing by a first portable device having an ultraviolet (UV) light sensor;
- sampling UV light stream, the UV light emitted from a video display on a second device screen;
- identifying digital fingerprint of the video display based on the UV light;
- deriving the time data by comparing the sample digital fingerprint to a full digital fingerprint produced by the UV light;
- transmitting periodically from the first portable device the identifying digital fingerprint sample having time data to a third device, the third device hosting a database containing a plurality of text files, each text file associated with a time code;
- associating time data of the identifying digital fingerprint sample to a time code of a text file in the database on the third device, the database containing text files for a plurality of videos;
- receiving the file and periodically synchronizing the text with the time data the time data based on fingerprint sample of in a subsequent UV light sample associated with the display on a second device screen when displaying the text on the first device as the second device produces the video display.

* * * * *